United States Patent [19]
Cole, Jr. et al.

[11] Patent Number: 5,769,191
[45] Date of Patent: Jun. 23, 1998

[54] UNIVERSAL STABILIZER STRUT FOR A TRUCK CAMPER

[75] Inventors: Earl Jackson Cole, Jr., Canyon Country; Larry Whaley, Palmdale, both of Calif.

[73] Assignee: Lance Camper Mfg. Corp., Lancaster, Calif.

[21] Appl. No.: 744,775

[22] Filed: Oct. 28, 1996

[51] Int. Cl.⁶ ....................................................... B60P 3/32
[52] U.S. Cl. ..................... 188/321.11; 267/120; 296/167; 188/322.19; 188/312
[58] Field of Search ................ 296/167, 76; 188/321.11, 188/312, 322.19, 266, 285; 403/122–144, 90, 328; 267/120, 64.25, 124

[56] References Cited

U.S. PATENT DOCUMENTS

| | | | |
|---|---|---|---|
| 1,050,571 | 1/1913 | Smith | 188/321.11 |
| 3,347,590 | 10/1967 | Bowen | 296/167 |
| 3,402,961 | 9/1968 | Larson | 296/167 |
| 3,549,194 | 12/1970 | Matson | 296/167 |
| 3,679,029 | 7/1972 | Thomas | 188/321.11 |
| 3,751,104 | 8/1973 | Thompson | 296/167 |
| 3,929,370 | 12/1975 | Farrell | 296/167 |
| 4,611,794 | 9/1986 | Taylor | 188/321.11 |
| 4,768,895 | 9/1988 | Ludwig et al. | 403/122 |
| 5,228,737 | 7/1993 | Zimmerman | 296/76 |
| 5,255,993 | 10/1993 | Kovacs | 403/328 |

*Primary Examiner*—Douglas C. Butler
*Attorney, Agent, or Firm*—Fulbright & Jaworski L.L.P.

[57] ABSTRACT

A universal stabilizer strut for a truck camper includes a hydraulic unit that is made in only one standard length and one or more interchangeable extension units, so that different designs of cabs with different heights and widths can be accommodated. Each end of the stabilizer strut is provided with a spherical mount that accommodates angular deviations between the strut and its attachment to the truck and to the camper. One end of the stabilizer strut is secured to an upper bracket extending downwardly and forwardly from a lower surface of the cabover portion of the camper and the other end of the stabilizer strut is secured to a lower bracket expending upwardly and rearwardly from the front bulkhead region of the truck chassis, with the two ends of the stabilizer strut being adapted to be quickly installed and removed from the two respective brackets. The two brackets are coupled to the ends of the stabilizer strut such that the forces exerted on the stabilizer strut by the rocking of the camper shell are oriented along the longitudinal axis of the stabilizer strut, and the quick release mechanism at either end is oriented perpendicular to that axis such that those forces have no tendency to cause the stabilizer to come detached. The upper bracket is secured within a track to facilitate fore-and aft adjustment of the upper end of the stabilizer strut.

5 Claims, 3 Drawing Sheets

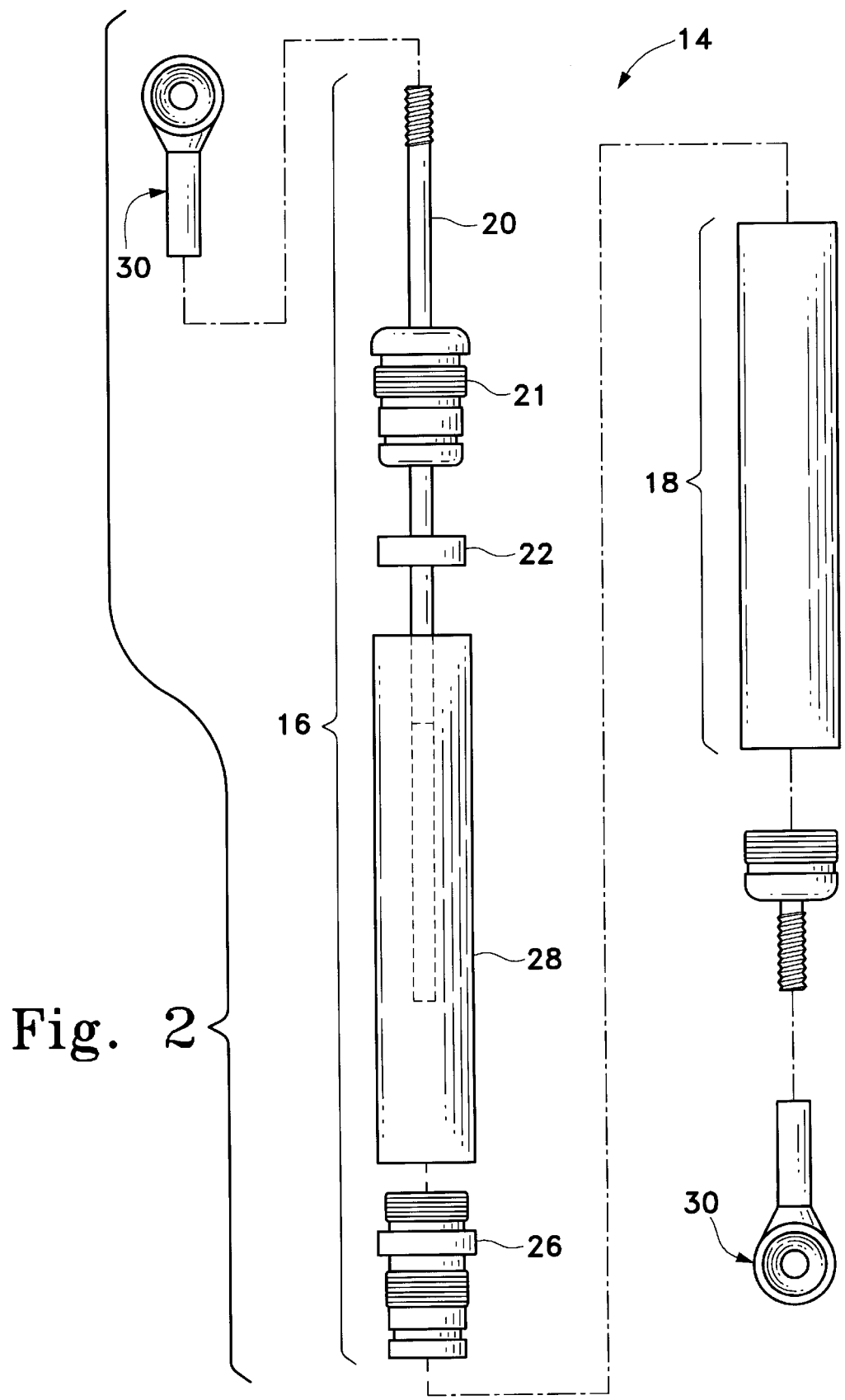

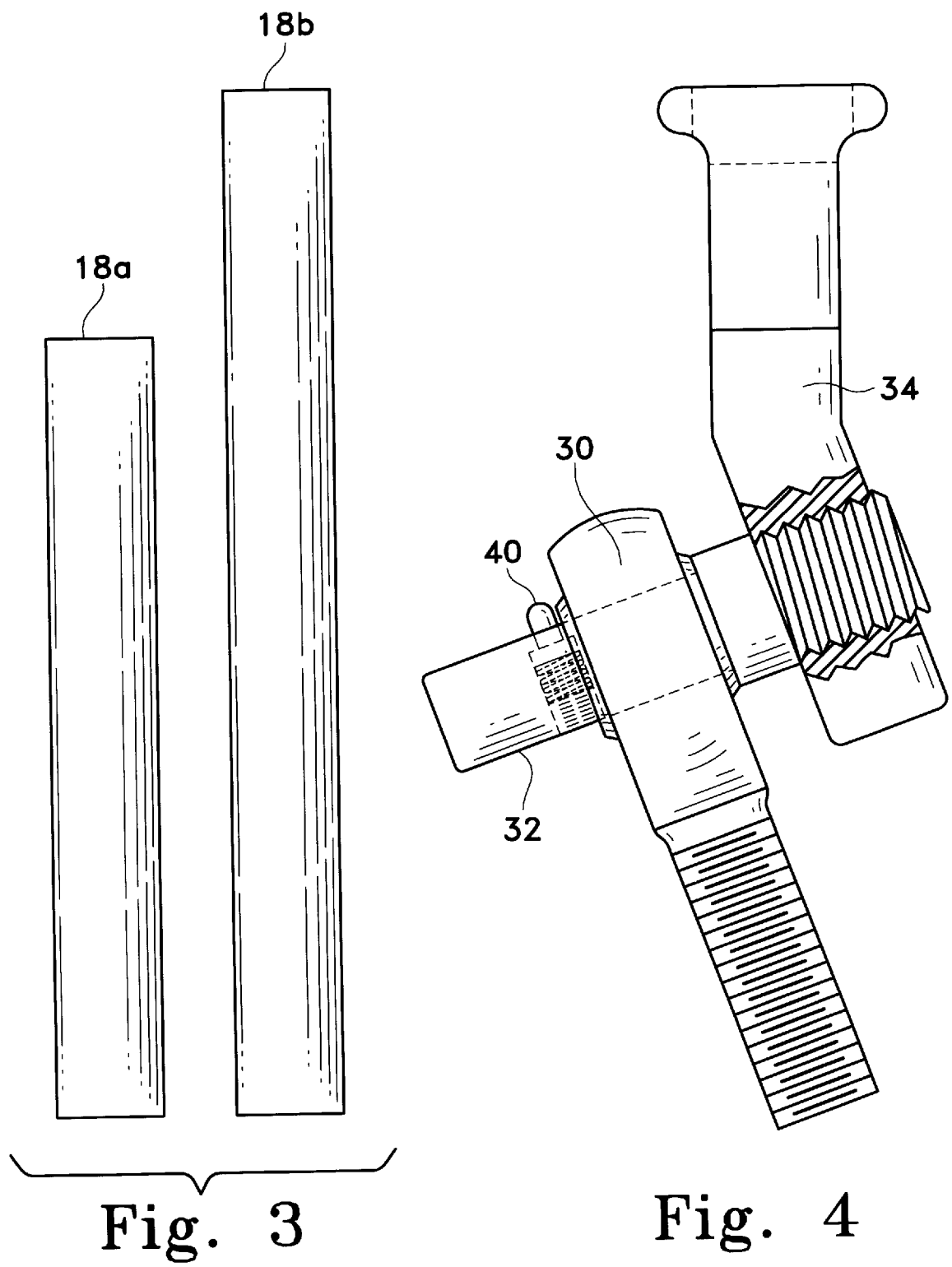

UNIVERSAL STABILIZER STRUT FOR A TRUCK CAMPER

TECHNICAL FIELD OF THE INVENTION

The present invention relates generally to shock absorbing struts and more particularly to a shock absorbing strut that can be mounted between a cabover portion of a truck camper and a structural member at the front of the truck on which the camper is mounted.

BACKGROUND OF THE INVENTION

Truck campers are available in many styles and sizes to accommodate the recreational needs of a variety of consumers. They typically have a lower portion which is adapted to fit inside the bed of a pick-up truck and are designed to be readily removed to permit the truck to be used for normal hauling. The larger commercially available truck camper extend rearwardly of the tail gate area, and include a cabover portion which has a sleeping space large enough to accommodate two twin size beds or a queen size bed and which extends forwardly from the main body of the camper above the cab of the truck and overhangs to either side and forwardly of the cab. The camper is typically fastened at the rear of the truck chassis by a turnbuckle arrangement and to the front of the bed by a tension spring. It is not practical to rigidly secure the overhanging front portion directly to the cab, and especially when traveling at highway speeds over a bumpy road, the camper will tend to rock about the rear of the truck, with the front part of the camper bouncing up and down. Unless that bounding is controlled, the camper shell will break away from its mountings inside the bed or the overhanging front part will break away from the main potion inside the bed. Accordingly, it is conventional to provide pair of hydraulic stabilizer struts on either side of the camper, between the overhanging cabover portion and a structural member at the front of the truck such as a windshield pillar or front bulkhead.

Full size pick up trucks are produced by several manufacturers, including Ford, General Motors, and Chrysler. Although all full size pick ups have a bed whose width and depth is determined in accordance with recognized industry standards. each manufacturer produces several models with different length beds and different length cabs, including a regular 2-door cab, an extended cab (with storage space or a jump seat behind the driver's seat), and a crew cab (with 4 doors). Since each truck manufacturer uses a different design of cab and chassis, it will be appreciated that a given size and style of cabover camper may be used with three different types of cabs from each of three different manufacturers, resulting in as many as 9 different mounting configurations for the stabilizer strut.

SUMMARY OF THE INVENTION

Accordingly, it is an overall objective of the present invention to provide an universal stabilizer strut that can be readily adapted for mounting to a variety of mounting configurations.

Another, more specific objective is to provide a stabilizer strut that can be readily disconnected when the camper is removed from the truck, and that can be readily reinstalled or reconfigured when the camper is replaced on the same truck or is reinstalled on another type of truck.

In accordance with one aspect of the invention, the stabilizer strut includes a hydraulic unit that is made in only one standard length and one or more interchangeable extension units, so that different designs of cabs with different heights and widths can be accommodated.

In accordance with another aspect of the invention, each end of the stabilizer strut is provided with a spherical mount that accommodates angular deviations between the strut and its attachment to the truck and to the camper.

Preferably, one end of the stabilizer strut is secured to an upper bracket extending downwardly and forwardly from a lower surface of the cabover portion of the camper and the other end of the stabilizer strut is secured to a lower bracket expending upwardly and rearwardly from the front bulkhead region of the truck chassis, with the two ends of the stabilizer strut being adapted to be quickly installed and removed from the two respective brackets.

In one specific embodiment, the upper bracket is secured within a track that is provided on a downwardly facing surface of the cabover portion of the camper, to thereby facilitate the fore-and aft adjustment of the upper end of the stabilizer strut to accommodate longitudinal variations in the position of the camper relative to the selected mounting position for the lower bracket at the front of the truck that will accommodate the lower portion of the stabilizer strut. In another specific embodiment, the upper bracket is secured directly to the downwardly facing surface, with the normal extension range of the stabilizer strut (typically several inches) accommodating even a substantial deviation (for example ±1") from the nominal distance (typically 24", 30", 36" or 42") between the two brackets.

The two brackets are preferably coupled to the ends of the stabilizer strut such that the forces exerted on the stabilizer strut by the rocking of the camper shell are oriented along the longitudinal axis of the stabilizer strut, and the quick release mechanism at either end is oriented perpendicular to that axis such that those forces have no tendency to cause the stabilizer to come detached.

BRIEF DESCRIPTION OF THE DRAWINGS

FIG. 2 is an exploded assembly view of the shock absorbing strut of FIG. 1.

FIG. 3 shows how the length of the spacer tube portion of the strut of FIG. 2 may be varied to accommodate different mounting distances between the camper and the truck.

FIG. 4 shows how a spherical mount at the end of the stabilizer strut may be removably secured to a stub axle extending from the mounting bracket, with an angular offset to accommodate the preferred angular position of the strut.

DETAILED DESCRIPTION OF THE INVENTION

Figure 1:
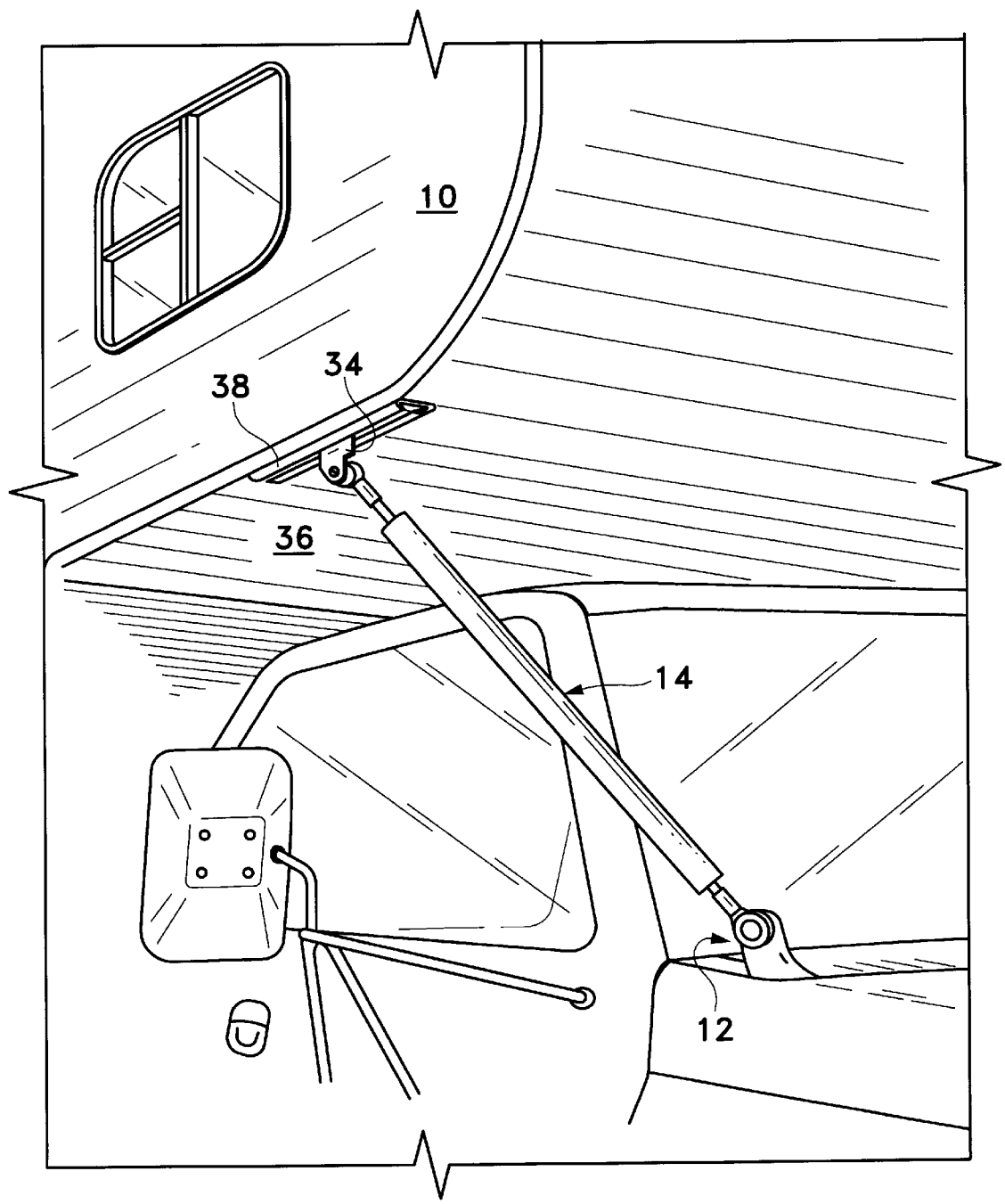
FIG. 1 shows a shock absorbing strut connecting an overhanging front portion of a camper to a structural member at the front of a truck, with a bracket and track assembly adjustably connecting an upper end of the strut to a downwardly facing surface of the camper's cabover sleeping compartment.

Referring now to FIG. 1, it may be seen that the overhanging front "cabover" 10 of a truck camper is connected to a bracket 12 at the front of the truck by means of a hydraulic shock absorbing strut 14, thereby controlling the tendency of the camper to rock about its attachment at the rear of the truck. The stabilizer strut 14 is preferably angled from the vertical both in the fore and aft directions (to absorb any fore and aft movement of the above portion of the camper relative to the truck) and in the side to side direction (to absorb any side to side movement).

As best shown in FIGS. 2 and 3, the stabilizer strut 14 includes a hydraulic unit 16 that is made in only one standard length and one or more interchangeable extension units 18, 18a, 18b, so that different designs of cabs with different heights and widths can be accommodated. Hydraulic unit 16 is made up of a piston rod 20, a piston 22 secured to a middle portion of the piston rod, an upper seal with a central bore for accommodating the upper end of the piston rod, a central seal 26 for accommodating the lower end of the piston rod, and a tubular cylinder 28 for accommodating the piston and extending between the two seals. The various components are conventionally assembled into a fluid tight hydraulic chamber, for example by means of threaded connections and "O-ring" seals. Each end of the stabilizer strut is provided with a spherical coupling 30 that accommodates angular deviations between the strut and its attachment to the truck and to the camper.

Referring again to FIG. 1, lower mounting bracket 12 extends upwardly and rearwardly from the front bulkhead region of the truck chassis and includes a stub axle 32 (see also FIG. 4) which passes through a central bore in spherical coupling 30.

The other end of the stabilizer strut is secured to an upper bracket 34 (see also FIG. 4) extending downwardly and forwardly from a lower surface 36 of the cabover portion of the camper and is preferably secured (for example, by means of a set screw) within a track 38 that is permanently affixed to the downwardly facing surface 36, to thereby facilitate the fore-and aft adjustment of the upper end of the stabilizer strut 14 and to accommodate longitudinal variations in the position of the camper 10 relative to the selected mounting position for the lower bracket 12 at the front of the truck However, it is also possible for the upper bracket 34 to be directly secured to the downwardly facing surface 36, with the normal extension range of the stabilizer strut 14 (typically several inches) accommodating even a substantial deviation (for example ±1") from the nominal distance (typically 24", 30–, 36– or 42") between the two brackets 12,34.

The two brackets 12, 34 are preferably coupled to the ends of the stabilizer strut such that the forces exerted on the stabilizer strut 14 by the rocking of the camper shell 10 are oriented along the longitudinal; axis of the stabilizer strut. To that end, as shown in FIG. 4, the stub axle 32 extending laterally from the depending portion of the bracket 34 is offset from the horizontal by an angle of about 20°, and a similar angle is provided in the stub axle portion of the lower bracket 12.

Still referring the FIG. 4, the spherical coupling 30 at the two ends of the stabilizer strut 14 are adapted to be quickly installed and removed from the two respective brackets 12, 34 by means of a spring loaded release mechanism 40 at the outboard end of the stub axle 32. Since the stub axle 32 is oriented perpendicular to the longitudinal axis of strut 14, the forces between the strut 14 and the brackets 12, 34 will be perpendicular to the longitudinal axis of the stub axle 32 and will not have any tendency to cause the stabilizer strut to come detached from the bracket.

Accordingly, the present invention provides an improved stabilizer strut that may be used on a variety of configurations of trucks and campers, and preferably may be readily installed and removed.

What is claimed is:

1. A shock absorbing strut adapted to be mounted between a cabover front portion of a truck camper and a structural member in a front bulkhead region of the truck on which the camper is mounted, said strut comprising:

a hydraulic unit having a first end and a second end and extending along a longitudinal axis;

an upper coupling secured to the first end of the hydraulic unit;

a lower coupling secured to the second end of the hydraulic unit;

a track secured to a downwardly facing surface of the cabover portion of the camper;

an upper bracket extending downwardly and forwardly from the track and adapted to releasably receive one of the two couplings;

means for securing the upper bracket to the trak such that the uper coupling is adjustable fore-and-aft:

a lower bracket extending upwardly and rearwardly from the structural member and adapted to releasably receive the lower coupling; and means for extending a body portion of said hydraulic unit in the direction of said longitudinal axis such that the spacinq between said first and second ends may be varied to accommodate different designs of truck cabs with different heights and width.

wherein each of said couplings includes a spherical member free to rotate in three perpendicular axes, and wherein said bracket and said spherical member collectively comprise a bore, an axle passing through the bore, and a quick-release mechanism for securing the axle inside the bore, whereby the strut may be readily adapted for installation on different designs of truck cabs with different heights and widths, and whereby the strut may be quickly and easily removed from the truck and the truck camper.

2. The strut of claim 1 wherein the bore and the axle are aligned along a radial axis perpendicular to said longitudinal axis.

3. The strut of claim 2 wherein the forces exerted on the stabilizer strut are perpendicular to said radial axis.

4. The strut of claim 1 further comprising a spring-loaded pin moveable in a direction perpendicular to said radial axis for securing the bracket to the coupling.

5. The strut of claim 1 wherein the hydraulic unit comprises a piston rod, a piston secured to a middle portion of the piston rod, a hydraulic cylinder for receiving the piston, a first seal at one end of the cylinder for receiving a first end portion of the piston rod, a second seal at another end of the cylinder for receiving a second end portion of the piston rod, and a spacer tube connected between the one end of the cylinder and the first coupling for accommodating the first end portion of the piston rod inside the spacer tube and for maintaining a predetermined fixed spacing between said first seal and the first end of the hydraulic unit;

wherein the second end portion of the piston rod is directly connected to the second coupling.

* * * * *